United States Patent [19]

Stubbolo

[11] Patent Number: 4,476,921
[45] Date of Patent: Oct. 16, 1984

[54] INSULATING AIR SHEATH FOR BUILDINGS AND THE LIKE

[75] Inventor: Louis Stubbolo, Wyoming, Del.

[73] Assignee: Aire-Wrap, Inc., Del.

[21] Appl. No.: 363,142

[22] Filed: Mar. 29, 1982

[51] Int. Cl.³ .............................................. F24H 7/00
[52] U.S. Cl. .................................. 165/48 R; 165/45; 237/69; 98/31; 126/400
[58] Field of Search .................. 165/45, 48 R; 98/31; 237/2 B; 126/400; 62/260; 52/309.12

[56] References Cited

U.S. PATENT DOCUMENTS

| | | | |
|---|---|---|---|
| 1,058,949 | 4/1913 | Diebel | 98/31 X |
| 3,049,067 | 8/1962 | Claude | 98/31 |
| 3,303,770 | 2/1967 | Anthnony | 98/31 |
| 4,006,856 | 2/1977 | Nilsson | 98/31 |
| 4,295,415 | 10/1981 | Schneider, Jr. | 98/31 |

FOREIGN PATENT DOCUMENTS 30041 3/1977 Japan ..................................... 62/260

Primary Examiner—Albert J. Makay
Assistant Examiner—Henry Bennett
Attorney, Agent, or Firm—Mortenson & Uebler

[57] ABSTRACT

Low grade heat is supplied to heat air which is used to provide an insulating sheath for a building or the like. The low grade heat is obtained from the ground below the hard frost line from either air or water, or from solar collectors, biomass or any other suitable source of such heat, and is used to heat air which is then circulated in a space within the walls of the building, thereby maintaining the internal temperature within the walls at approximately 45°-65° F. The air insulating sheath so provided reduces the driving force which takes heat out of the building in winter and which permits heat entry in summer. The energy required to bring the internal building temperature to a comfortable degree in winter or summer is thereby drastically reduced, as is the cost associated therewith.

12 Claims, 6 Drawing Figures

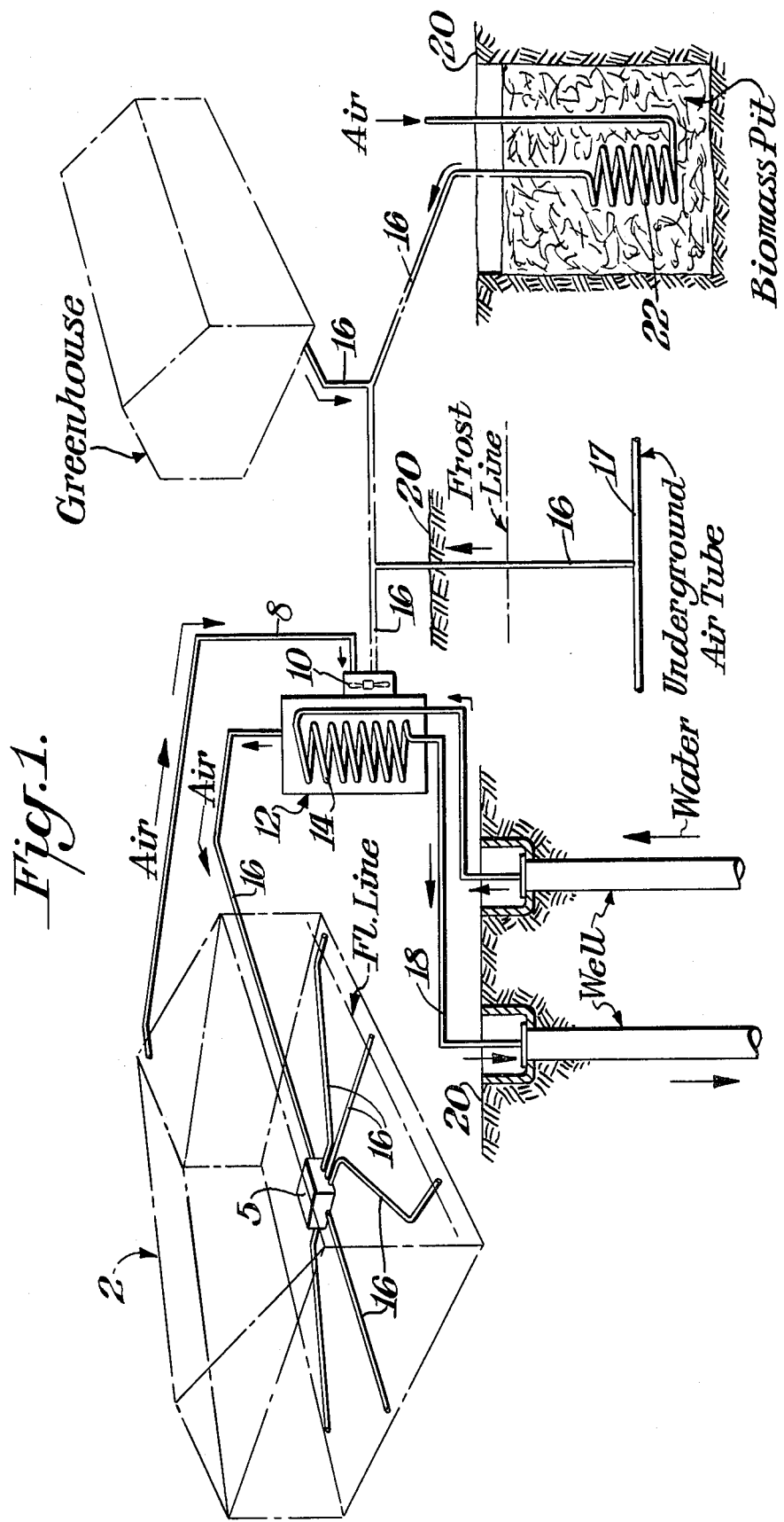

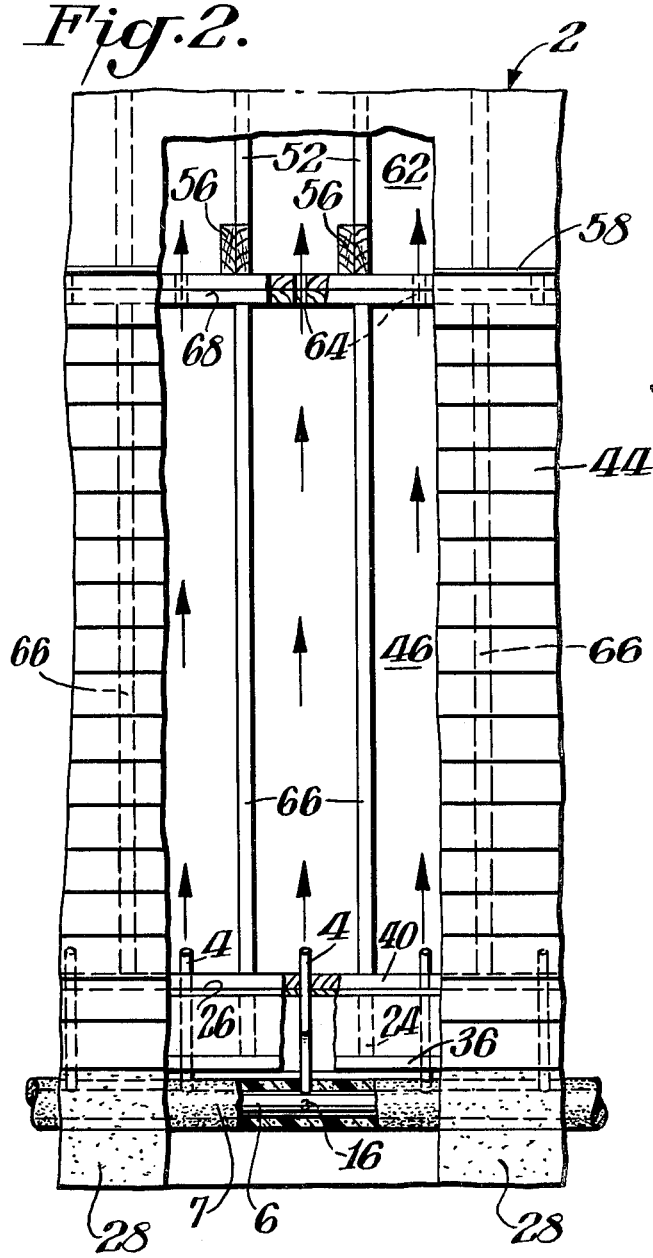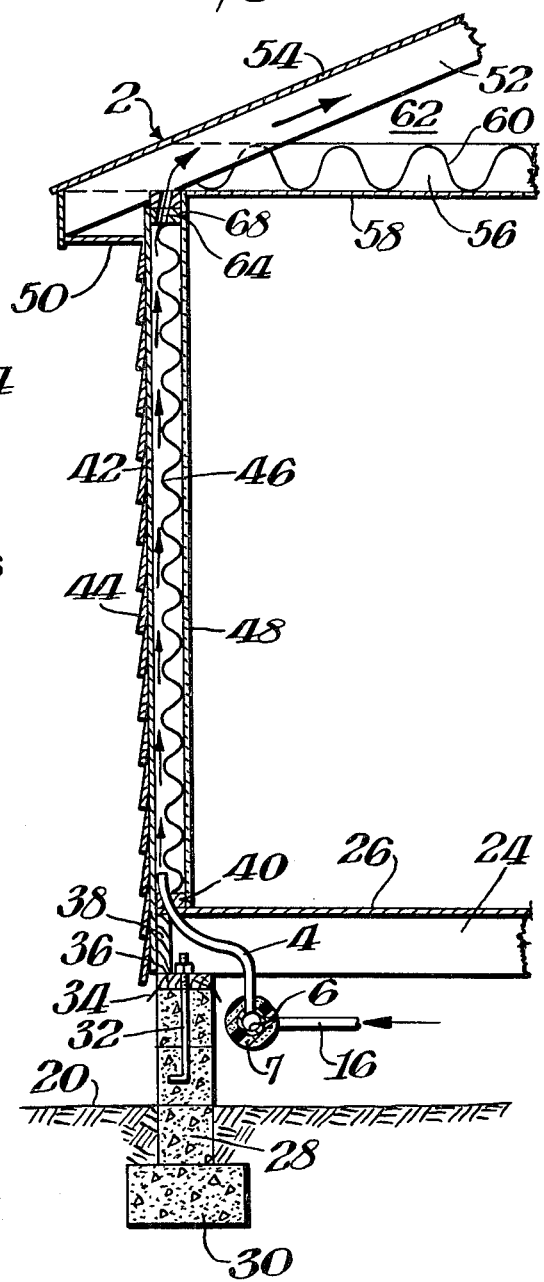

INSULATING AIR SHEATH FOR BUILDINGS AND THE LIKE

BACKGROUND OF THE INVENTION

This invention relates to a building structure wherein heated air is supplied to spaces located in the walls, below the floor and above the ceiling of the building to provide a sheath of heated air surrounding the internal, useable space within the structure. The air supplied to these spaces is heated using low grade heat obtained from the ground, from either air or water obtained from below the hard frost line, from solar collectors, from biomass or from any other available source of such heat.

By definition, the term "low grade heat" as used herein denotes heat obtainable from various sources but at levels below the temperature needed for human comfort, i.e. below approximately 65° F. The temperature below the hard frost line in northern regions of the United States remains substantially constant year round, at a low of approximately 45° F. in northernmost states (except Alaska) to 50°-55° F. in the middle states. In southern regions which do not freeze, the ground temperature several feet below ground level remains constant year round at approximately 65° F. The heat that is available from either air or water obtained from below ground at depths which do not vary in temperature year round is ideal as the source of low grade heat to be used in accordance with the principles of this invention.

U.S. Pat. No. 4,089,142, discloses a building structure including a concrete slab which forms the building structure foundation which supports the building enclosure mounted thereon and is interposed between the building enclosure and the ground. Means are provided for thermally insulating the periphery of the slab from the ground, downwardly from the surface of the ground to at least the extent of the ground frost line and the placement of a series of edge abutting parallel rows of end-to-end abutting hollow cinder or concrete blocks, in axial alignment underlying the concrete slab and axially aligned in heat transfer relationship therewith and with the ground below the frost line. The hollow blocks form a series of parallel transverse air circulation paths and means are provided for communicating these air flow paths within said blocks to the interior of said building enclosure such that thermal radiation entering the building structure interior and impinging upon the building interior causes heat to be circulated by air flow through said parallel air flow paths within the cinder blocks and within the interior of said building blocks acting as a heat sink.

The aforesaid patent discloses heating of the concrete slab by providing glass windows on the vertical walls of the building structure on the sides facing the sun to permit direct impingement of the sun on the upper surface of the concrete slab and building structure interior to thermally heat air flowing within the building structure by convection.

U.S. Pat. No. 3,527,921 discloses a building structure provided with a peripheral foundation insulated to approximately the depth of minimal seasonal temperature variations. The floor of the building is a concrete slab and sand is provided below the slab with electric heating mats located in the sand aproximately one foot below the slab to permit storing heat energy in the sand and in the ground beneath so that electric power can be used to heat the building for substantial periods of time either to take advantage of off-peak power or to minimize the effects of electrical power failures.

U.S. Pat. No. 3,965,694 discloses a system having the capability of being used as both a heating and cooling system. Therein, at least one heat pump is provided to pump heat from a heat source to the air conditioning system to prevent freezing of the system. The heat pump also removes heat from the system, when it is used as a cooling system, and diffuses it into the earth. The earth is also utilized as a source of heat to be supplied to the system.

None of the known prior art references provides or suggests the building structure of this invention, namely a building structure in which the useable living space is substantially surrounded by an insulating sheath of air, said air maintained at a temperature in the approximate range of 45°-65° F., said air being heated to this temperature range by a suitable source of low grade heat.

SUMMARY OF THE INVENTION

A building structure is provided comprising a foundation supporting a building having floor, sidewalls, ceiling and a roof and means for circulating air maintained in the temperature range of approximately 45°-65° F. below and adjacent the floor, above and adjacent the ceiling, and within spaces in the walls, thereby providing an insulating sheath of air substantially surrounding the useable space within the building.

Also provided is the method of insulating a building structure, the building structure having a foundation supporting a building having floor, sidewalls, ceiling and a roof, the method comprising circulating air maintained in the temperature range of 45°-65° F. below and adjacent the floor, above and adjacent the ceiling, and within spaces in the walls, thereby providing an insulating sheath of air substantially surrounding the building. The air is preferably heated to the temperature range by circulating it through the ground below the hard frost line at the location of the building structure. The air may be heated to the temperature range by heat exchange with water obtained from below the hard frost line at the location of the building structure, or by using solar collection devices, biomass degradation and the like.

BRIEF DESCRIPTION OF THE DRAWINGS

FIG. 1 is an overall schematic view of the component parts of this invention.

FIG. 2 is a side elevational view, in part broken away, of a conventional building structure having the air insulating sheath according to this invention.

FIG. 3 is a cross-sectional view of the building structure of FIG. 2.

Figure 4:
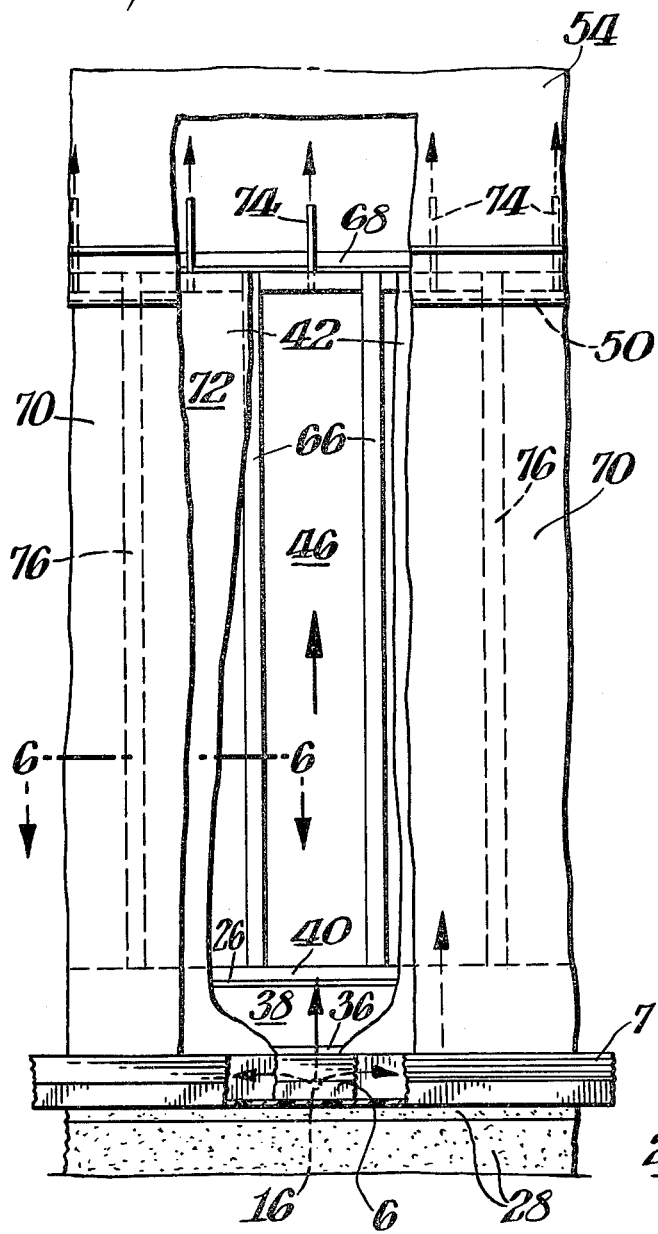
FIG. 4 is a side elevational view, in part doubly broken away, of a building structure having an additional wall air channel to carry the insulating air sheath according to this invention.

DETAILED DESCRIPTION OF THE INVENTION AND PREFERRED EMBODIMENTS WITH REFERENCE TO THE DRAWINGS

Low grade heat is supplied to heat air which is used to provide an insulating sheath for a building or the like. The low grade heat is obtained from the ground below the hard frost line from either air or water, or from solar collectors, biomass or any other suitable source of such heat, and is used to heat air which is then circulated in a space within the walls of the building, thereby maintaining the internal temperature within the walls at approximately 45°–65° F. The air insulating sheath so provided reduces the driving force which takes the heat out of the building in winter and which permits heat entry in summer. The energy required to bring the internal building temperature to a comfortable degree in winter or summer is thereby drastically reduced, as is the cost associated therewith.

When older homes were built, batt insulation, designed to be installed between framing members, was non-existent. Builders then depended on the dead air space within wall cavities to act as an insulation or they specifically framed a design allowing natural convection within a wall to achieve air circulation, presumably to control moisture buildup, wood decay, and particularly for ventilation in the warm months. Air entry locations in the foundation of such homes could be blocked off in the cold months, thereby changing the free flow of ventilation air to a dead air gap for winter insulation.

In the present invention, the foundation (above ground level) of the older building structure should be as air tight as possible as should the external walls and roof. An air circulator, which may be a fan, is used to force low-grade warm air into the crawl space or basement of the building, creating a low pressurization of the area.

The warm air will cover the bottom of the floor and, because of the low pressurization, air will flow in an upward direction through the cavities within the walls and then into the attic space. The air may be collected via a duct and recirculated or discharged to the atmosphere.

Warm air is continuously being replaced from the air distribution system at a rate equal to the amount of air dispersed into the attic, plus the fraction of additional air necessary to achieve the low pressurization.

As the warm forced air makes its ascent upward within the wall cavities, a series of changes occur. While the forced air is rising within a wall cavity, eddy currents occur and air films can double, producing 4 films instead of 2 as is the case with dead air, thereby increasing its insulating capability.

A detailed description of the invention is best provided by reference to the accompanying drawings of which FIG. 1 schematically illustrates the various features. Therein, building structure 2 is shown being supplied air from air ducts 16 which are supplied air from heat exchanger 12. The cavities in the walls of building structure 2 are omitted in FIG. 1 for convenience, but will be described in detail hereinbelow. The air supplied to building structure 2 is preferably obtained by circulating air through the underground air tubes 17 located well below the frost line at the given location. This air will have a temperature in the range of approximately 45° F. to approximately 65° F., depending on the latitude of the building. This air can be circulated using the air circulator 10, which may be a fan, directly to the building structure through supply line 16, or it may be routed through the heat exchanger 12, as shown. This air provides an insulating sheath about the building at a temperature of approximately 45° F. to 65° F., depending upon location. The details of providing the insulating air sheath about the building structure are described below in connection with the description of FIGS. 2 through 6.

Other sources of low grade heat supply may be employed to heat the air needed to supply the insulating sheath. One method would be to use water obtained from one well below the frost line, pipe it through a water line 18 shown in FIG. 1 to a heat exchange coil 14 which heats the air supplied to the structure, and discharge the water after use to a second well as shown. If this method is used, it is believed that the two wells should be located at least 50 feet apart to insure that the used water will return to the ground without adversely affecting the temperature or characteristics of water in the supply well.

Alternatively, the air supply to the building structure could be heated by means of solar passive collectors located outside the building structure. The greenhouse shown in FIG. 1 is an example of a passive solar collector or by various biomass materials such as manure or compost placed in a pit into which is inserted an air heating exchange coil 22, also shown in FIG. 1.

Used air from the attic of building structure may be collected and recirculated to the heat exchanger 12 by means of return line 8 to aid in the overall efficiency of the system if necessary or desirable.

FIG. 2 shows the foundation, wall structure, in part broken away, and roof of a building structure using the air insulating sheath of this invention for retrofitting of existing buildings which were built after World War II using Western platform type construction methods. Therein, heated (or cool) air is supplied from air supply line 16 to the open area below the flooring of the building structure and to the air distributor 6, which is preferably PVC piping in this type of construction. From the distributor 6, air passes into ducts 4 extending through sole plate 40 and into the spaces between the studs 66 in the wall of the building, passing upwardly as indicated by the arrows between the exterior sheathing 42 and inside wall 48. If there is insulation 46 in the wall cavity, the air passes between the insulation and the exterior sheathing and inside wall. Air openings 64 are provided in the top plate 68 to permit the air to pass from the wall spaces into the attic opening 62, from whence it can be discharged or sent back to the air supply heat exchanger 12.

Also shown in FIG. 2 are the building foundation 28, floor joists 24, subflooring 26, roof rafters 52, ceiling joists 56 and ceiling 58 of building structure 2.

FIG. 3 shows the building structure in cross-section, wherein air enters the space below the flooring 26 and pressurizes the air within the foundation. As indicated by the arrow, air enters supply line 16 which feeds air distributor 6, and passes through air ducts 4 which, preferably, are 1-inch diameter flexible plastic pipe extending through openings in sole plate 40. The air discharges from ducts 4 into the space between exterior sheathing 42 and interior wall 48, passing upwardly as shown by the arrows. The air then passes through the openings 64 in the top plate 68 and passes into the attic space 62.

As thus described, air supplied at 45° F. to 65° F. surrounds the interior living space of the building structure and provides an insulating sheath or envelope around the building.

For completeness, additional components of building structure 2 shown in FIG. 3 include footings 30, foundation blocks 28, anchor bolt 32, termite shield 34, sill 36, header 38, siding 44, wall insulation (if any) 46, soffit 50, roof rafter 52, roofing 54, ceiling joist 56, ceiling 58, ceiling insulation 60 and attic space 62.

Figure 5:
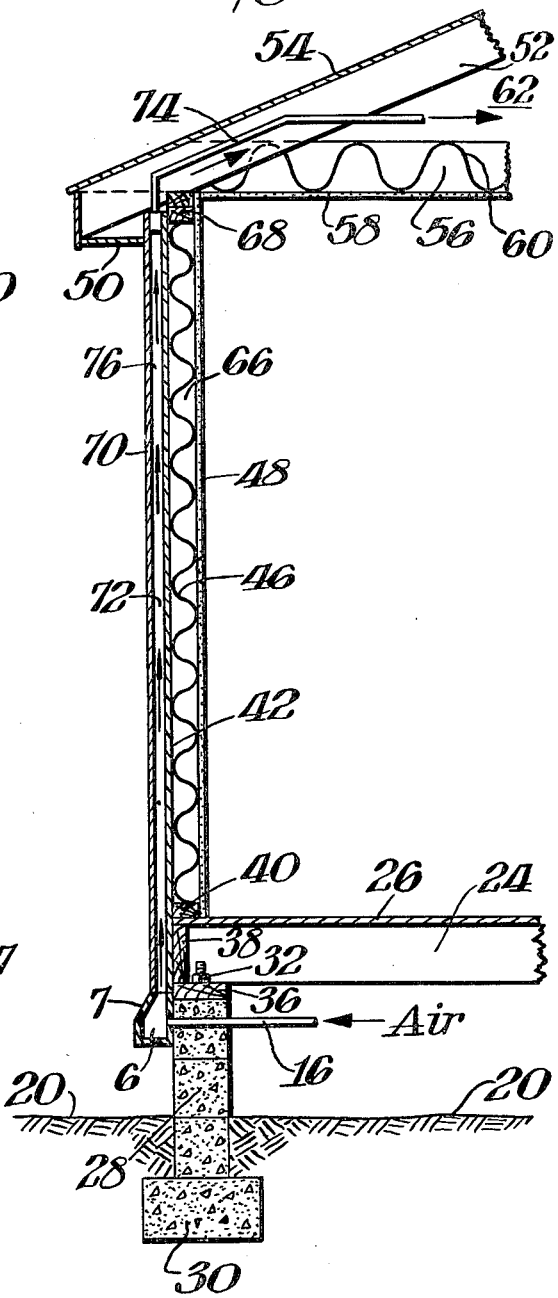
FIG. 5 is a cross-sectional view of the building structure of FIG. 4.
Figure 6:
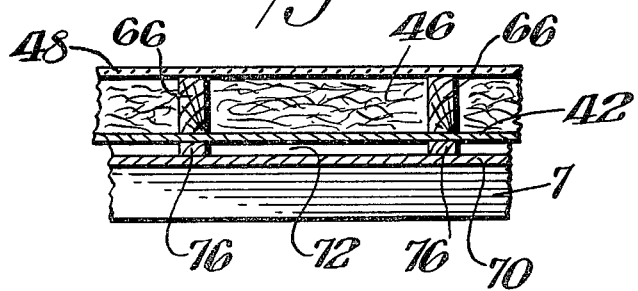
FIG. 6 is a top view, in part in cross-section, of the building structure of FIG. 4 taken along the line 6—6 of FIG. 4.

FIGS. 4-6 show an alternative embodiment for providing the air insulating sheath around a building according to this invention to be used principally on new construction. FIG. 4 shows a front elevational view, in part doubly broken away, of a construction wherein a space or gap is provided adjacent the exterior sheathing of the walls of the structure to provide a passageway for the insulating air. Air enters distributor 6 from duct 16 and passes sidwardly and upwardly as indicated by the arrows into the space or air channel 72 between the internal sheathing 42 and the exterior sheathing 70. This air passes upwardly between furring strips 76 and passes into the attic through ducts 74 as shown, from whence it may be recirculated to circulator 10 (not shown).

The side cross-sectional view of the building structure 2 shown in FIG. 5 may provide a better understanding of the construction of this alternative embodiment. Air entering distributor 6 from supply line 16 passes into air channel 72 between interior sheathing 42 and exterior sheathing 70, and passes upwardly as shown by the arrows exiting through ducts 74 into attic space 62.

Structural details of the building structure shown in FIGS. 4 and 5 are identical to those shown in FIGS. 2 and 3 for convenience of illustration.

FIG. 6 shows a top view, partly in cross-section, of the wall shown in FIG. 4 taken along the line 6—6 thereof. This figure shows the relative positioning of the interior wall 48, wall studs 66, interior sheathing 42, furring strips 76 and exterior sheathing 70, all to provide for air channel 72 through which the insulating air passes.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

I claim:

1. The method of insulating a building structure comprising:
    (a) obtaining low grade heat from air or water below the hard frost line at the location of said building, said low grade heat being in the temperature range of approximately 45°-65° F.,
    (b) heating or cooling air to the temperature range of approximately 45°-65° F. by heat exchange with said low grade heat in a first heat exchange wherein a liquid that has been circulated below the frost line to collect said low grade heat is delivered to a first heat exchanger to provide a first source of heating or cooling to the air circulating within said heat exchanger, and a second heat exchange wherein sid low grade heat is transferred to ambient air that is circulated through a second heat exchanger and said ambient air is then delivered by conduit means to said first heat exchanger, thereby providing a second source of said low grade heat to the air within said first heat exchanger, and
    (c) circulating said heated or cooled air below and adjacent the floor of said building, above and adjacent the ceiling of said building, and within said channels in the walls of said building, thereby providing an insulating sheath of air substantially surrounding but not entering the useable space within said building.

2. A combination building structure and air circulation means comprising a foundation supporting a building having a floor, sidewalls having air channels therein, a ceiling and a roof, and means for obtaining low grade heat from air or water below the hard frost line at the location of said building, said low grade heat being in the temperature range of approximately 45°-65° F., and means for heating or cooling air to the temperature range of approximately 45°-65° F. by heat exchange with said low grade heat in a first heat exchange wherein a liquid that has been circulated below the frost line to collect said low grade heat is delivered to a first heat exchanger to provide a first source of heating or cooling to the air circulating within said heat exchanger, and a second heat exchange wherein said low grade heat is transferred to ambient air that is circulated through a second heat exchanger and said ambient air is then delivered by conduit means to said first heat exchanger, thereby providing a second source of said low grade heat to the air within said first heat exchanger, and circulating said heated or cooled air in the temperature range of approximately 45°-65° F. to the space below and adjacent said floor, the space above and adjacent said ceiling, and within said channels in said walls, thereby providing an insulating sheath of air substantially surrounding but not entering the useable space within said building.

3. The building structure and air circulation means of claim 2 wherein said ambient air is heated or cooled by circulating it through the ground below the hard frost line at the location of said building structure.

4. The building structure and air circulation means of claim 2 wherein said ambient air is heated or cooled by heat exchange with water obtained from below the hard frost line at the location of said building structure.

5. The building structure and air circulation means of claim 2 having additional means to heat said air comprising a solar collection device, biomass degradation, or the like.

6. The method of claim 1 wherein said ambient air is heated by circulating it through the ground below the hard frost line at the location of said building structure.

7. The method of claim 1 wherein said ambient air is heated by heat exchange with water obtained from below the hard frost line at the location of said building structure.

8. The method of claim 1 having additional means to heat said air comprising a solar collection device, biomass degradation or the like.

9. The structure of claim 2 including means for recirculating a portion of said heated or cooled air from said building to said first heat exchanger.

10. The structure of claim 2 wherein said second heat exchanger includes piping installed below the hard frost line through which said ambient air is passed enroute to said first heat exchanger.

11. The method of claim 1 wherein a portion of said heated or cooled air is recirculated from said building to said first heat exchanger.

12. The method of claim 1 wherein said second heat exchanger includes piping installed below the hard frost line through which said ambient air is passed enroute to said first heat exchanger.

* * * * *